United States Patent Office 2,879,262
Patented Mar. 24, 1959

2,879,262

RUBBER VULCANIZATION WITH SUBSTITUTED TETRAMETHYLENE THIURAMS AND DITHIOCARBAMATES

Frank A. V. Sullivan, Glenbrook, Conn., assignor to American Cyanamid Company, New York, N.Y., a corporation of Maine No Drawing. Application January 9, 1956
Serial No. 557,839

5 Claims. (Cl. 260—79.5)

This invention relates to the vulcanization of rubber. More particularly, it relates to a process of vulcanizing natural and synthetic rubber and rubber latices using a new class of accelerators, and to compositions of matter comprising said accelerators.

The new class of accelerators used in accordance with the process of this invention are thiuram disulfides and the zinc salts thereof having the formula

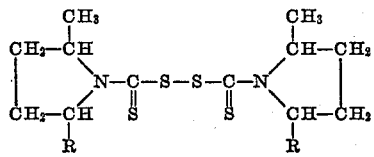

wherein R is selected from the group consisting of H and $CH_3$.

The accelerators of the present invention are useful with natural rubber as well as synthetic rubber. By the latter is meant synthetic like polymers of butadiene-1,3 and copolymers of butadiene-1,3 with vinyl-type monomers copolymerizable with butadiene-1,3 such as acrylonitrile, styrene, acrylamide and the like. Because of their "ultra" accelerating activity, the accelerators of this invention, particularly the dithiocarbamates, find use in the vulcanization of natural and synthetic latices as well as in the vulcanization of raw rubber. In addition, they may be successfully used as activators with other types of accelerators, e.g., the thiazoles.

The amount of accelerator employed may vary according to the particular composition being treated. In the case of the disulfides it may also vary depending on whether or not free sulfur is present. When used in natural rubber or latex, the accelerator may be present in amounts as high as 5% on the rubber. Usually, however, it will not be more than about 3 or 4%. When treating synthetic rubber-like polymers and copolymers or synthetic latices, the amount of accelerator will generally be somewhat less. In either case, the amount of accelerator will usually not exceed 1.5%, being for the most part employed in amounts of about 0.2–1.0%.

The thiuram disulfides of this invention may be prepared by oxidizing an aqueous solution of a salt of the corresponding alkyl substituted cyclotetramethylene dithiocarbamic acid. The corresponding zinc salt of the thiuram disulfide may be prepared by reacting the dithiocarbamic acid with a zinc salt.

The following examples further illustrate the invention. All parts are by weight unless otherwise indicated.

EXAMPLE 1

N,N'-2-methyltetramethylene thiuram disulfide

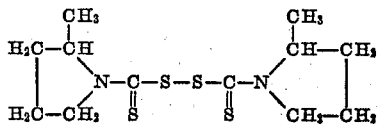

28.6 parts of sodium 2-methyltetramethylene dithiocarbamate are dissolved in 150 parts of water. To this is added dropwise at 25–35° C. a mixture of 9.3 parts of glacial acetic acid and 2.65 parts of a 30% solution of hydrogen peroxide. On completion of addition the reaction mixture is digested for 0.5 hour and then filtered. The product is washed, dried and recrystallized to give a 64% yield of product melting at 128–131° C. Percent nitrogen—theory 8.75; found 8.71.

EXAMPLE 2

Zinc N,N'-2-methyltetramethylene dithiocarbamate

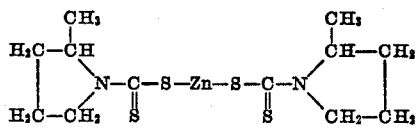

To 120 parts of a 70.7% aqueous solution of 2-methylpyrrolidine dissolved in 250 parts water containing 40 parts of NaOH is added 76 parts of carbon disulfide at 40–42° C. On cooling to room temperature, sodium 2-methyltetramethylene dithiocarbamate precipitates necessitating the addition of an additional 250 parts of water to keep it in solution. To this solution is added 91.7 parts of zinc acetate dissolved in 300 parts of water and the reaction mass stirred for four hours. The precipitate was then separated by filtration, washed in water and dried at 105° C. The yield of crude product approaches quantitative and on recrystallization from butyl cellosolve melts at 187–188° C. Percent nitrogen— theory 7.26; found 7.02. Percent sulfur—theory 33.2; found 33.0.

EXAMPLE 3

N,N'-2,5-dimethyltetramethylene thiuram disulfide

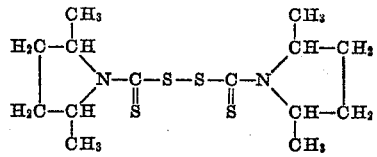

13.8 parts of sodium N,N-2,5-dimethyltetramethylene dithiocarbamate are dissolved in 125 parts of water. To this solution is added dropwise at 5–10° C. a mixture of 3.2 parts of a 30% solution of hydrogen peroxide and 6.8 parts of concentrated hydrochloric acid and 35 parts of water. On completion of addition the reaction mixture is digested an additional 0.5 hour and filtered. The product is washed and dried to give an 86% yield of product melting at 144–148° C.

EXAMPLE 4

Zinc N,N'-2,5-dimethyltetramethylene dithiocarbamate

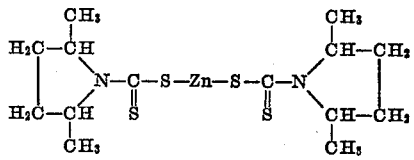

11.7 parts of sodium N,N-2,5-dimethyltetramethylene dithiocarbamate is dissolved in 20 parts of water. This solution is added simultaneously with a solution containing 3.4 parts of zinc chloride in 20 parts of water to a flask containing 20 parts of water. After addition is complete, the reaction mixture is stirred at 90° C. for 0.5 hour. The product is separated by filtration, washed and dried to give a quantitative yield of product melting at 243–245° C.

The following examples demonstrate the vulcanization of dry rubber and latex using the accelerators of this invention. Unless otherwise noted, all parts are by weight. Modulus and tensile strength are measured in p.s.i.

EXAMPLE 5

Compositions are prepared according to the following base formula:

| Compound: | Parts |
|---|---|
| Smoked sheets | 100 |
| Zinc oxide | 5 |
| Stearic acid | 1 |
| Whiting | 80 |
| Sulfur | 2 |
| Light process oil | 2 |
| Accelerator | 0.3 |

Samples of these compositions are then cured at 130° C. for 15 and 20 minute periods. Results appear in Table I.

TABLE I

| Compound | 15 Min. Cure | | | 20 Min. Cure | | |
|---|---|---|---|---|---|---|
| | Mod., 500% | Tens. | Percent Elong. | Mod., 500% | Tens. | Percent Elong. |
| Tetramethyl thiuram disulfide | 1,325 | 3,050 | 690 | 1,200 | 2,825 | 680 |
| N,N'-2-methyl tetramethylene thiuram disulfide | 1,200 | 2,875 | 700 | 1,250 | 2,850 | 680 |

The results of Table I indicate that the thiuram disulfide accelerator of this invention is about as fast as tetramethyl thiuram disulfide, one of the better commercially available ultra accelerators, and is substantially equivalent in other respects.

EXAMPLE 6

The procedure of Example 5 is repeated except that the accelerators were changed and the compositions tested at curing times of 5 and 10 minutes. Results appear in Table II.

TABLE II

| Compound | 5 Min. Cure | | | 10 Min. Cure | | |
|---|---|---|---|---|---|---|
| | Mod., 500% | Tens. | Percent Elong. | Mod., 500% | Tens. | Percent Elong. |
| Zn N,N'-2-methyl tetramethylene dithiocarbamate | 975 | 2,900 | 750 | 975 | 2,950 | 740 |
| Zn (dibutyl dithiocarbamate) | 650 | 1,825 | 740 | 850 | 2,650 | 780 |
| Zn (diethyl dithiocarbamate) | 875 | 2,750 | 780 | 1,000 | 2,975 | 760 |

The results show that the accelerator according to this invention is faster than either zinc (dibutyl-) or zinc (diethyl dithiocarbamate) both excellent, commercially available accelerators.

EXAMPLE 7

The procedure of Example 5 is again repeated except that N,N'-2,4-dimethyltetramethylene thiuram disulfide is substituted for the 2-methyl derivative and modulus is at 300%. Similar results are obtained as shown in Table III.

TABLE III

| Compound | 15 Min. Cure | | | 20 Min. Cure | | |
|---|---|---|---|---|---|---|
| | Mod., 300% | Tens. | Percent Elong. | Mod., 300% | Tens. | Percent Elong. |
| Tetramethyl thiuram disulfide | 350 | 2,750 | 700 | 350 | 2,700 | 710 |
| N,N'-2,5-dimethyl tetramethylene thiuram disulfide | 250 | 2,175 | 750 | 300 | 2,725 | 730 |

EXAMPLE 8

Example 6 is repeated except that the zinc salt of N,N'-2,5-dimethyltetramethylene dithiocarbamate is employed in place of the zinc salt of N,N'-2-methyltetramethylene dithiocarbamate and modulus is at 300%. Results similar to those of Example 6 are obtained as shown in Table IV.

TABLE IV

| Compound | 5 Min. Cure | | | 10 Min. Cure | | |
|---|---|---|---|---|---|---|
| | Mod., 300% | Tens. | Percent Elong. | Mod., 300% | Tens. | Percent Elong. |
| Zn N,N'-2,5-dimethyltetramethylene dithiocarbamate | 250 | 2,500 | 800 | 275 | 2,800 | 770 |
| Zn (dibutyl dithiocarbamate) | 200 | 1,375 | 700 | 250 | 2,600 | 800 |
| Zn (diethyl dithiocarbamate) | 250 | 2,700 | 780 | 300 | 2,975 | 770 |

The following example illustrates the use of an accelerator of this invention in latex.

EXAMPLE 9

Compositions are prepared according to the following base formula:

| Compound: | Parts |
|---|---|
| Rubber from latex | 100 |
| Zinc oxide | 2 |
| Sulfur | 1.5 |
| Titanium dioxide | 5 |
| Antioxidant | 1.5 |
| Casein | 1 |
| Surface active agent | 1 |
| Accelerator | 1 |

Samples of the compositions are then cured for 7½ and 10 minutes at 100° C. Results appear in Table V.

TABLE V

| Compound | 7½ Min. Cure at 100° C. | | | | 10 Min. Cure at 100° C. | | | |
|---|---|---|---|---|---|---|---|---|
| | Mod., 500% | Mod., 700% | Tens. | Percent Elong. | Mod., 500% | Mod., 700% | Tens. | Percent Elong. |
| Zn N,N'-2-methyltetramethylene dithiocarbamate | 375 | 1,550 | 5,100 | 930 | 375 | 1,700 | 4,925 | 900 |
| Zn (diethyl dithiocarbamate) | 325 | 1,250 | 4,825 | 980 | 425 | 1,800 | 4,950 | 890 |
| Zn (dibutyl dithiocarbamate) | 475 | 2,275 | 4,575 | 830 | 425 | 1,950 | 4,650 | 860 |

I claim:

1. A method of vulcanizing an unvulcanized elastomer selected from the group consisting of natural rubber and synthetic rubber-like butadiene-1,3 polymers which comprises incorporating in said elastomer a compound selected from the group consisting of N,N'-2-methyltetramethylene thiuram disulfide, N,N'-2,5-dimethyltetramethylene thiuram disulfide and the zinc salts thereof and subjecting the resultant mixture to heat for sufficient time to establish the cure.

2. A method according to claim 1 in which the compound is N,N'-2-methyltetramethylene thiuram disulfide.

3. A method according to claim 1 in which the compound is zinc N,N'-2-methyltetramethylene dithiocarbamate.

4. A method according to claim 1 in which the compound is N,N'-2,5-dimethyltetramethylene thiuram disulfide.

5. A method according to claim 1 in which the compound is zinc N,N'-2,5-dimethyltetramethylene dithiocarbamate.

References Cited in the file of this patent

UNITED STATES PATENTS

| | | |
|---|---|---|
| 1,445,621 | Cadwell | Feb. 20, 1923 |
| 2,283,334 | Neal | May 19, 1942 |
| 2,665,268 | Butler | Jan. 5, 1954 |